United States Patent [19]

Douglass

[11] Patent Number: 5,099,712
[45] Date of Patent: Mar. 31, 1992

[54] AUTOMATIC TRANSMISSION WITH FREE-WHEELING DRIVE SHAFT

[76] Inventor: David S. Douglass, 625 S. Windsor, Mesa, Ariz. 85204

[21] Appl. No.: 400,368

[22] Filed: Aug. 30, 1989

[51] Int. Cl.⁵ ............................................... F16H 3/08
[52] U.S. Cl. ..................................... 74/363; 74/336 R; 192/105 CD
[58] Field of Search .................. 74/3, 336 R, 337, 368, 74/369, 363, 333, 336 B, 370; 73/548; 280/236, 238; 474/56, 163; 192/48.91, 48.92, 64, 103 B, 105 CD

[56] References Cited

U.S. PATENT DOCUMENTS

| | | | |
|---|---|---|---|
| 1,670,403 | 5/1928 | Davidson | 74/368 |
| 1,713,909 | 5/1929 | Marcher | 192/105 CD X |
| 1,969,561 | 8/1934 | Keller | 74/336 |
| 1,979,077 | 10/1934 | Pilaar | 74/336 |
| 1,979,080 | 10/1934 | Roeder | 74/337 |
| 2,047,174 | 7/1936 | Baumgartner | 74/363 X |
| 2,049,103 | 7/1936 | Baumgartner | 74/363 |
| 2,165,201 | 7/1939 | Baumgartner | 74/363 |
| 2,219,812 | 10/1940 | Hochstetter | 74/336 |
| 2,789,440 | 4/1957 | Pethybridge | 74/368 |
| 3,067,626 | 12/1962 | Doemis et al. | 74/368 |
| 3,889,547 | 6/1975 | Sun et al. | 74/336 |
| 3,969,948 | 7/1976 | Pipenhagen, Jr. | 280/236 X |
| 4,301,690 | 11/1981 | Cavanagh | 74/333 X |
| 4,716,777 | 1/1988 | Hartmann | 74/369 |
| 4,771,636 | 9/1988 | Fujita | 74/371 |
| 4,841,794 | 6/1989 | Hikishima | 74/371 |

FOREIGN PATENT DOCUMENTS

| | | | |
|---|---|---|---|
| 2930988 | 2/1981 | Fed. Rep. of Germany | 192/48.91 |
| 416648 | 12/1946 | Italy | 74/368 |
| 79372 | 1/1934 | Sweden | 74/336 |
| 235693 | 5/1945 | Switzerland | |
| 28760 | of 1904 | United Kingdom | 74/368 |
| 593941 | 10/1947 | United Kingdom | 74/333 |

Primary Examiner—Leslie A. Braun
Assistant Examiner—Benjamin Levi
Attorney, Agent, or Firm—Matthews & Associates

[57] ABSTRACT

An automatic transmission having a plurality of driving gears which are individually and selectedly placed in driving engagement with a drive shaft dependent upon the speed of rotation of the drive shaft. The method of automatically engaging and disengaging the drive coupling between a drive gear and the drive shaft is such as to permit the drive shaft to free wheel whenever the rotation of the drive gear is retarded or stopped. The releasable coupling is achieved by centrifugally actuated pawls which selectedly engage in detent notches about the inner diameter of the drive gears and which pawls automatically retract and disengage from these notches when the drive gears are retarded or stopped.

8 Claims, 1 Drawing Sheet

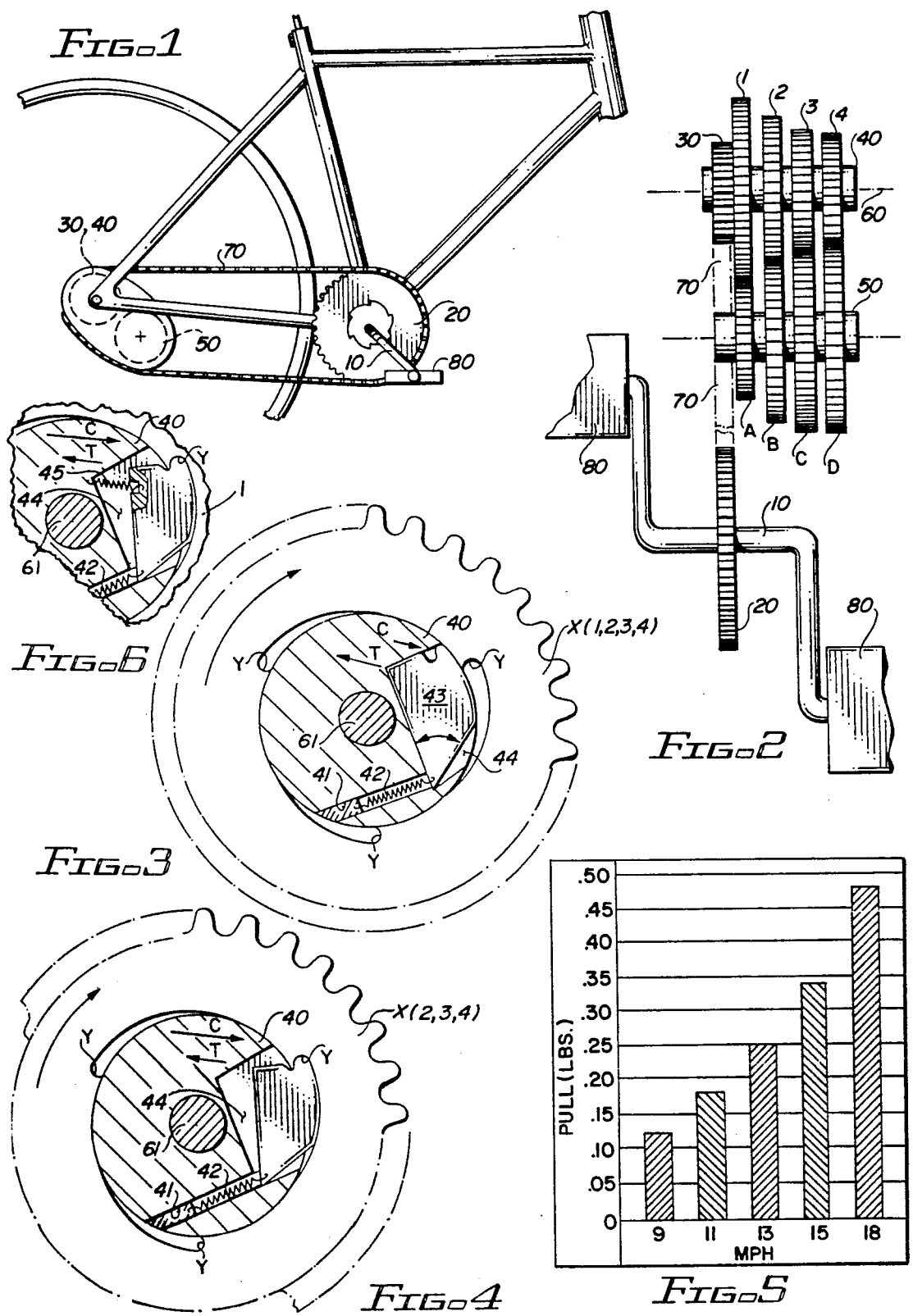

AUTOMATIC TRANSMISSION WITH FREE-WHEELING DRIVE SHAFT

BACKGROUND

1. Field of the Invention

The invention relates to automatic drive transmissions. In particular, the invention relates to an automatic drive in which the gear ratio changes automatically as the speed of a driven shaft increases and which has the characteristic that the driven shaft is free to continue rotating when the driving gears are retarded or stopped in their rotation.

2. Prior Art

Automatic transmissions known to the prior art generally comprise a first driven shaft which is connected to a prime mover. There is a second shaft, in parallel relationship to the first shaft. This second shaft is the shaft from which power is taken and provided to wheels or other equipment. In general, a series of gears are affixed to the driven shaft and these gears have varying diameters. A similar set of gears is freely coupled to the second shaft and these gears have complimentary diameters to the gears on the driven shaft such that they are capable of mating with the gears on the driven shaft and the shafts remain parallel. The effect is to provide a differing set of gear ratios available when coupling drive power from the first shaft to the second.

As noted, the gears coupled to the second shaft are freely coupled thereto so that, although restrained to remain meshed with the gears on the first shaft, the second shaft may rotate freely within these gears without driving the gears or being driven by them. Typically, a clutching arrangement is used to couple one of these gears in a driving relationship with the second shaft. By choosing which of the series of gears is clutch-coupled to the second or output shaft the gear ratio between the first shaft, coupled to the primary driving force, and the second shaft, providing the output power, is determined.

The present invention will differ from the prior art in several ways. For instance, the primary motor force will be coupled directly to a first drive gear which will in turn be coupled to a drive shaft and the coupling between the first drive gear and the drive shaft will be maintained only until the drive shaft is otherwise driven on a selected greater speed. The same drive gear which initially drives the drive shaft will also provide the motive force to drive a drive transfer shaft from which driving force will be transferred to the drive shaft in varying gear ratios depending upon the speed of rotation of the drive shaft.

SUMMARY OF THE INVENTION

The invention is an automatic transmission. The claims herein are first laid to the free-wheeling drive shaft characteristic of the invention. A selected drive gear has a shaft engaging means on an inner, shaft-receiving diameter thereof. A driven shaft is emplaced within this shaft-receiving diameter. The driven shaft has releasable coupling means for engaging with the shaft-engaging means of the selected drive gear when that drive gear is driving the shaft. However, the releasable coupling means automatically releases the coupling between drive shaft and drive gear as soon as the rotation of the drive gear is retarded with respect to the rotation of the driven shaft. Thus, the shaft freely rotates when its rotary speed exceeds that of the selected drive gear.

In a presently preferred embodiment of the invention the shaft engaging means comprises a pawl-engaging detent notch. The releasable coupling means, in turn, comprises a drive-engaging pawl pivotally coupled to the driven shaft so as to pivotally extend into and engage with the detent notch when the selected drive gear is driving the shaft. Conversely, the pawl will pivotally withdraw and disengage from the detent notch when the rotation of the selected drive gear is retarded with respect to the driven shaft.

A second shaft is next disclosed. This is a transfer shaft which has affixed to it a drive transfer gear. The drive transfer gear is coupled to and is driven by a first drive gear. The transfer shaft has a second drive transfer gear affixed to it. This second drive transfer gear is, in turn, coupled to a second drive gear that is coupled to the driven shaft by a second releasable coupling means. Both the second drive transfer gear and the second drive gear are coupled together so that the second drive gear is itself driven by the second drive transfer gear.

The second releasable coupling means is similar to the first, already described, except that the drive-engaging pawl in the second releasable coupling means is centrifugally actuated such that it is pivotally extended into and engages with a second detent notch within the second drive gear when the driven shaft is driven in excess of a selected rotary speed. When the second drive gear is retarded with respect to the driven shaft, the centrifugally actuated pawl is, like the pawl of the first releasable coupling means, pivotally withdrawn and disengaged from the detent notch within the second drive gear.

The gear ratio between the second drive transfer gear and the second drive gear is such that the rotary speed of the drive shaft is increased when it is driven by the second drive gear. The second drive gear is drivingly coupled to the drive shaft upon engagement of the centrifugally actuated, drive-engaging pawl with the second pawl engaging detent notch in the second drive gear.

The drive shaft has a centrifugal load-biasing means coupled to the centrifugally actuated, drive-engaging pawl whereby the centrifugally actuated pawl is restrained from pivotally extending from the drive shaft until the drive shaft exceeds a selected rotary speed. When the drive shaft is retarded to rotate below a second selected rotary speed, the extended, centrifugally actuated pawl is pivotally withdrawn so as to disengage the drive shaft from the shaft engaging means on the inner diameter of the second drive gear.

In the presently preferred embodiment of the invention, disclosed herein, the centrifugal load-biasing means comprises a spring having a selected spring constant, the spring constant being related to the rotary speed of the drive shaft at which the centrifugally actuated, drive-engaging pawl will extend from the drive shaft and engage with a detent notch in the second drive gear.

Finally, the invention includes a wheeled vehicle which has a drive mechanism. The drive mechanism is drivingly coupled to the first gear drive. The drive shaft itself is then drivingly coupled to a wheel of the vehicle. This arrangement provides a drive transmission for the vehicle which has a speed-determined gear ratio.

DESCRIPTION OF THE DRAWINGS

FIG. 1 illustrates the invention being utilized on a bicycle to provide the bicycle with an automatic transmission which requires no shifting activity on the part of the bicycle rider other than to pedal the bike at a desired speed.

FIG. 2 is diagrammatic schematic of the automatic transmission of the invention as used on a bicycle.

FIG. 3 illustrates a driving gear having detent notches and mounted on a shaft to be driven. A detent engaging pawl, on the shaft, is positioned so as not to engage with the detents of the gear.

FIG. 4 is the same illustration as FIG. 3 but the detent engaging pawl has been extended so as to come into engagement with the detent notches on the gear.

FIG. 5 is a graphic illustration of the amount of spring tension versus bicycle speed, in miles per hour, required to permit a detent engaging pawl to be extended from the drive shaft to engage the detent in a drive gear.

FIG. 6, similar to FIG. 4, but in detail, shows the addition of a spring exerting an outward force against the pawl associated with drive gear 1.

A DETAILED DESCRIPTION OF THE INVENTION

For purposes of promoting an understanding of the principles of the invention, reference will now be made to the embodiments illustrated in the drawings and specific language will be used to describe same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

In FIG. 1, a bicycle is illustrated which has the automatic transmission of the invention mounted at the rear of the bicycle. The bicycle has a crank 10 which is driven by foot pressure applied to pedals 80. The crank drives sprocket 20 which is coupled by means of drive chain 70 to a rear wheel sprocket 30.

Rear wheel sprocket 30 is coupled through various driving gears, not illustrated in this figure, to driven shaft 40 which transfers drive to the rear wheel of the bicycle. The coupling to the driven shaft is sometimes achieved by the transfer of drive through transfer drive shaft 50. The arrangement is shown schematically in greater detail in FIG. 2.

In FIG. 2, driven shaft 40 is seen to have 4 drive gears, 1, 2, 3, and 4, coupled to it. All four of these gears are releasably coupled to driven shaft 40 such that if the bicycle of FIG. 1 were to be wheeled in a forward direction, driven shaft 40 would rotate freely within all four drive gears 1-4. This free wheeling results from a releasable coupling mechanism between drive shaft 40 and the inner diameter of any one of drive gears 1-4. The releasable coupling mechanism is such that when crank 10 is rotated by force applied to pedals 80, in conventional manner, crank sprocket 20 rotates and transfers the driving force applied to pedals 80 through chain 70 to rear wheel sprocket 30. Rear wheel sprocket 30 is affixed to drive gear 1. Rear wheel sprocket 30 rotates at the same speed as drive gear 1 but may rotate at a different speed than driven shaft 40 which always rotates freely within rear sprocket 30.

When drive from peddles 80 is applied to rear sprocket 30, drive gear 1 rotates and engages in a releasable fashion with driven shaft 40. The engagement of drive gear 1 and drive shaft 40 causes drive shaft 40 to rotate. Since drive shaft 40 is coupled to the rear axle of the bicycle, the rear wheel of the bicycle is driven into rotation causing forward movement of the bike.

The pedals forces applied to rear sprocket 30 are also coupled through drive gear 1 to rotatingly drive drive transfer gear A which is affixed to transfer shaft 50. Transfer shaft 50 is always driven at a speed determined by the gear ratio between drive gear 1 and drive transfer gear A.

In addition to drive transfer gear A, transfer shaft 50 has affixed thereto additional drive transfer gears, for example, B, C, and D. The diameters of these gears, moving from A to D in the illustration of FIG. 2, progressively increase. These mesh with the progressively decreasing diameters of drive gears 1-4 on driven shaft 40. The two shafts, driven shaft 40 and transfer shaft 50, are thus maintained in a parallel relationship and driven shaft 40 is driven at a speed dependent upon two factors; the gear ratio, for example, B:2; and the driving gear which is drivingly coupled to driven shaft 40, for example, gear 2. So long as driving gear 1 is drivingly coupled to driven shaft 40, driven transfer gears B, C and D will freely rotate driving gears 2, 3 and 4, respectively, about driven shaft 40 without any driving force being transferred from drive gears 2, 3 and 4 to driven shaft 40.

The gear shifting sequence within the automatic transmission is determined by the speed of rotation of driven shaft 40. Assume a bike rider applies force to pedals 80 so as to rotate drive gear 1 in the direction which will drive the bicycle in a forward direction. A releasable coupling mechanism between driven shaft 40 and drive gear 1 will be engaged and cause driven shaft 40 to be rotated so as to advance the bicycle. At the same time transfer shaft 50 is caused to rotate because of the coupling between driving gear 1 and driven transfer gear A. Although this causes gears B, C and D to rotate, which in turn rotate gears 2, 3 and 4, driven shaft 40 rotates freely within gears 2, 3 and 4 and receives no driving force therefrom.

With the bicycle in motion the bike rider may decide it is time to move to a higher speed. He does this by applying force to pedals 80 so as to cause crank 10 to rotate crank sprocket 20 at a higher rotary speed. This higher rotary speed is transferred through drive gear 1 to driven shaft 40. At a pre-determined rotary speed of, driven shaft 40, the releasable coupling means between gear 2 and shaft 40 is actuated to engage both gear 2 and shaft 40. Because of the gear ratio established between drive transfer gear B and drive gear 2, driven shaft 40 will be driven at a higher speed which will cause shaft 40 to rotate freely within drive gear 1, that is, drive gear 1 is no longer drivingly coupled to driven shaft 40. The bike rider may then continue to rotate crank 10 at a slower nominal rotary speed so as to maintain drive gear 2 drive coupled to shaft 40.

Should the bike rider again decide to move the bike at a higher speed, he applies sufficient force to pedals 80 to cause crank 10 to rotate crank sprocket at a higher than nominal speed. This higher than nominal rotary speed is transferred through drive gear 1 and drive transfer gear A to transfer shaft 50. Drive transfer gear B then causes drive gear 2, which is drivingly coupled to shaft 40, to rotate shaft 40 at a higher speed. As a result of driven shaft 40 rotating at a higher speed, the releasable coupling mechanism between driven shaft 40 and drive gear 3 is activated so as to place drive gear 3 into driving engagement with driven shaft 40. Because of the gear ratio, C:3, driven shaft 40 will now rotate at a faster speed and the driving engagement between drive gear 2 and shaft 40 will be released. Drive will now be applied to shaft 40 via drive gear 3 and shaft 40 will freely rotate within drive gears 1, 2 and 4. The bicycle rider may now resume pedaling in a slower nominal fashion and drive gear 3 will remain drivingly coupled to shaft 40 propelling the bicycle forward at a higher speed without the necessity for the bike rider to peddle faster than in a nominal manner.

Drive gear 4 is drivingly coupled to driven shaft 40 in a similar manner by peddling faster until the engagement of drive gear 4 with driven shaft 40 is achieved. While four drive gears have been illustrated herein, this has been done for exposition purposes only and not by way of limitation. The number of driving gears actually employed is a design decision. The manner in which a drive gear is drivingly coupled to driven shaft 40, in a manner dependent upon the speed of rotation of shaft 40, is illustrated in FIGS. 3 and 4.

In FIG. 3 a drive gear X is illustrated. Drive gear X is representative of any one of drive gears 1, 2, 3 or 4. Gear X surrounds driven shaft 40 and may freely rotate about driven shaft 40 in the structural configuration illustrated in FIG. 3. A transverse bore 41 in shaft 40 houses a spring 42 which is coupled to a pawl 43 which sit in a recess 44 and is pivotally coupled to shaft 40. Spring 42 has a selected spring constant which applies a tensile force T in the direction of the arrow indicated such as to retain pawl 43 in the disposition illustrated in FIG. 3.

The curved arrow, within the major diameter of gear X illustrates the direction of rotation of the rear wheel of the bicycle of FIG. 1 when the bicycle is moving in a forward direction. This curved arrow also indicates the direction of rotation of drive gear X and driven shaft 40 when the bike is pedaled to move it in a forward direction. As driven shaft 40 is rotated, a centrifugal force C is exerted on pawl 43. Initially, this centrifugal force is relatively small compared to the spring tension force T, as indicated by the differences in the arrows marked T and C in FIG. 3. Because the spring tensile force T is greater than the centrifugal force C, pawl 43 will be maintained in the position illustrated in FIG. 3 and gear X will continue to rotate freely about or with respect to driven shaft 40.

The situation presented in FIG. 4 is different. In this figure, driven shaft 40 is rotated at a speed sufficient to cause the centrifugal force C acting on pawl 43 to exceed the tensile force T applied by spring 42 to restrain movement of pawl 43. This is illustrated by the different lengths of the arrows C and T in FIG. 4. Because the centrifugal force exerted on the pawl is greater than the spring tensile force restraining it, pawl 43 moves outward, pivotally, away from the periphery of driven shaft 40. Disposed about the inner diameter of drive gear X are a plurality of pawl-engaging detent notches Y. When pawl 43 moves outward it will engage with a pawl-engaging detent notch Y because gear X is being driven at a slightly higher. Once the pawl 43 has successfully engaged with a notch Y in gear X, gear X will continue to drive shaft 40 until the speed of rotation of drive gear X is retarded or stopped altogether.

When gear X is retarded or stopped altogether the effect is as though driven shaft 40 continued to rotate in the direction of the curved arrow of FIG. 4 while gear X proceeded to rotate in the reverse direction, relatively speaking. As shaft 40 continues to rotate within the inner diameter of gear X, pawl 43, pivotally coupled to shaft 40 will be drawn out of engagement with detent notch Y and driven, by contact with the inner diameter of shaft X, into the structural relationship indicated in FIG. 3. It is, of course, understood that pawl 43 will be centrifugally urged outward to the configuration illustrated in FIG. 4 each time pawl 43 is extended outward away from shaft 40. However, pawl 43 can never be drivingly coupled to gear X so long as shaft 40 and gear X are rotating in relatively opposite directions, such as will occur when the bike rider allows the bicycle to coast forward.

If the bike rider persists in coasting, on level ground, the bike will eventually slow. This causes driven shaft 40 to rotate slower than previously and the centrifugal force being applied to pawl 43 will decrease allowing the tensile force of the spring 42 to draw pawl 43 back into its position with its boundaries aligned with the periphery of driven shaft 40.

So that the pawls 43 associated with the various drive gears 2, 3 and 4 may be actuated at differing speeds, the spring constant of spring 42 varies with respect to the gear, 2-4, to be engaged. Thus, as illustrated in FIG. 5 the tensile force of spring 42 applied into the pawl 43 associated with gear 2 may be somewhat greater than one-tenth of a pound so as to cause gear 2 to become drivingly engaged with driven shaft 40 at approximately 9 miles per hour. If the spring 42 coupled to pawl 43 associated with drive gear 3 is selected to have approximately one-quarter pound of spring tension, driving gear 3 will become drivingly engaged with driven shaft 40 when the bicycle is moving at approximately 13 miles per hour. The graph of FIG. 5 illustrates the concept of how the spring tension controls the speed at which the gears are shifted in the automatic transmission.

The discussion of the releasable coupling mechanism with the detent engaging pawls and the various spring co-efficients required to actuate the pawls into driving engagement with their associated drive gears at selected speeds holds true for drive gears 2, 3 and 4. However, it would be inconvenient if a bike rider had to somehow cause the bicycle to move forward at a given speed before drive gear 1 were drivingly coupled to driven shaft 40. Thus, the releasable coupling arrangement associated with drive gear 1 is modified slightly from that already discussed. FIG. 6 may be employed to explain the mechanism for releasably coupling shaft 40 to drive gear 1. The modification requires that a spring 45 be positioned so as to exert an outward directed force against pawl 43 so as to always maintain it in intimate contact with the inner diameter of drive gear 1. In this fashion, when drive gear 1 is initially rotated by force applied to pedals 80 of the bicycle, gear 1 will move in the direction of the curved arrow; pawl 43 will engage within pawl engaging detent notch Y and the drive applied to gear 1 will be transferred to driven shaft 40. In this manner, drive will always be available for starting the bicycle. With respect to drive gear 1, there is no requirement for use of spring 42.

As previously explained, when driven shaft 40 increases in speed relative to the rotation of drive gear 1, pawl 43 will be moved by its contact with the inner diameter of gear 1 so as to now compress spring 45 and to move itself into alignment with shaft 40 whenever pawl 43 encounters the minimum internal diameter of gear 1. Spring 45 will, of course, drive pawl 43 outward each time the interior diameter of gear 1 increases, as it will when detent notches Y are encountered.

In the illustrations of FIGS. 3 and 4 reference 61 refers to the axle of the rear wheel of a bicycle. Driven shaft 40 and the bicycle axle 61 share the same axis 60.

What has been disclosed is an automatic transmission having a plurality of driving gears which are individually and selectedly placed in driving engagement with a drive shaft dependent upon the speed of rotation of the drive shaft. The method of automatically engaging and disengaging the drive coupling between a drive gear and the drive shaft is such as to permit the drive shaft to free wheel whenever the rotation of the drive gear is retarded or stopped. The releasable coupling is achieved by centrifugally actuated pawls which selectedly engage in detent notches about the inner diameter of the drive gears and which pawls automatically retract and disengage from these notches when the drive gears are retarded or stopped.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such a clear and concise manner that those skilled in the art may readily understand and practice the invention, that which is claimed is:

1. A free wheeling driven shaft comprising:
    a first drive gear having first shaft-engaging means on an inner, shaft-receiving diameter thereof;
    a driven shaft emplaced within said shaft-receiving diameter; and
    first releasable coupling means, on said driven shaft, for coupling said first shaft-engaging means when said first gear is driving said shaft and for automatically releasing said coupling as soon as the rotation of said first drive gear is retarded with respect to the rotation of said driven shaft,
    wherein said first shaft-engaging means comprises a pawl-engaging detent notch; and said first releasable coupling means comprises a drive-engaging pawl pivotally coupled to said driven shaft for pivotally extending into and engaging with said detent notch when said first drive gear is driving said shaft and pivotally withdrawing and disengaging from said detent notch when the rotation of said first drive gear is retarded with respect to said driven shaft; and further comprising
    a transfer shaft having fixedly coupled thereto a drive transfer gear coupled to and driven by said first drive gear.

2. The free-wheeling shaft of claim 1 further comprising:
    a second drive transfer gear fixedly coupled to said transfer shaft; and
    a second drive gear coupled by second releasable coupling means to said driven shaft and having second shaft-engaging means on an inner, shaft-receiving diameter,
    said second drive transfer gear and said second drive gear being coupled wherein said second drive gear is driven by said second drive transfer gear.

3. The free-wheeling shaft of claim 2 wherein said second shaft engaging means comprises a second pawl-engaging detent notch.

4. The free-wheeling shaft of claim 3 wherein second releasable coupling means comprises a centrifugally actuated, drive-engaging pawl pivotally coupled to said driven shaft for pivotally extending into and engaging with said second detent notch when said driven shaft is driven in excess of a selected rotary speed and for pivotally withdrawing and disengaging from said second detent notch when the rotation of said second drive gear is retarded with respect to said driven shaft.

5. The freewheeling shaft of claim 4 further comprising a gear ratio between said second drive transfer gear and said second drive gear such that the rotary speed of said driven shaft is increased when driven by said second drive gear in relation to the speed at which it was driven by said first drive gear,
    said second drive gear being drivingly coupled to said driven shaft upon engagement of said centrifugally actuated, drive-engaging pawl with said second pawl-engaging detent notch.

6. The free-wheeling shaft of claim 5 wherein said driven shaft further comprises centrifugal load-biasing means coupled to said centrifugally actuated drive-engaging pawl whereby said centrifugally actuated pawl is restrained from pivotally extending from the said driven shaft until said driven shaft exceeds said selected rotary speed and for pivotally withdrawing said, centrifugally actuated pawl when said driven shaft is retarded to rotate below a second selected rotary speed.

7. The free-wheeling drive shaft of claim 6 wherein said centrifugal load-biasing means comprises a spring having a selected spring constant.

8. The free-wheeling driven shaft of claim 7 further comprising a wheeled vehicle having a drive mechanism,
    said drive mechanism being drivingly coupled to said first drive gear, and
    said driven shaft being drivingly coupled to a wheel of said vehicle,
    whereby said wheel is driven by a speed-determined gear ratio.

* * * * *